United States Patent
Yoo et al.

(10) Patent No.: US 10,429,588 B1
(45) Date of Patent: Oct. 1, 2019

(54) CHIRPED GRATING SURFACE EMITTER WITH UNIFORM POWER EMISSION FOR BEAM-STEERING APPLICATIONS

(71) Applicant: The Regents of the University of California, Oakland, CA (US)

(72) Inventors: Sung-Joo Ben Yoo, Davis, CA (US); Kuanping Shang, Davis, CA (US); Yu Zhang, Woodland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/172,527

(22) Filed: Oct. 26, 2018

Related U.S. Application Data

(60) Provisional application No. 62/577,981, filed on Oct. 27, 2017.

(51) Int. Cl.
 *G02B 6/293* (2006.01)
(52) U.S. Cl.
 CPC ................. *G02B 6/29301* (2013.01)
(58) Field of Classification Search
 CPC ............ G02B 6/02138; G02B 6/02152; G02B 6/02123; G02B 6/02133; G02B 6/02142; G02B 6/124; G02B 6/12007; G02B 6/34; G03F 7/70058; G03F 7/7035; G03F 7/70633; H01L 2924/0002
 See application file for complete search history.

(56) References Cited

U.S. PATENT DOCUMENTS

| | | | | |
|---|---|---|---|---|
| 5,546,481 A | * | 8/1996 | Meltz | G02B 6/126 385/11 |
| 5,793,907 A | * | 8/1998 | Jalali | G02B 6/2861 385/24 |
| 5,894,533 A | * | 4/1999 | Heise | G02B 6/12007 385/14 |
| 5,926,587 A | * | 7/1999 | Chen | G02B 6/12021 385/14 |
| 6,014,482 A | * | 1/2000 | Laude | G02B 6/29311 385/24 |
| 6,174,648 B1 | * | 1/2001 | Terao | G02B 6/02138 430/321 |
| 6,226,426 B1 | * | 5/2001 | Magne | G02B 6/12007 385/14 |

(Continued)

*Primary Examiner* — Andrew Jordan
(74) *Attorney, Agent, or Firm* — Park, Vaughan, Fleming & Dowler LLP

(57) ABSTRACT

The disclosed embodiments relate to the design of an optical phased array grating. This optical phased array grating includes an optical waveguide comprising a first material having a uniform lateral width, wherein the first material confines the optical waveguide as the optical waveguide core. It also includes an overlay layer comprising a sequence of overlays made of a second material spaced across a top surface of the optical waveguide, wherein successive overlays in the sequence have continuously varying longitudinal duty cycles and continuously varying lateral widths between an input end and an output end of the overlay layer, and wherein the second material has a lower optical index than the first material. The optical phased array grating also includes a cladding layer comprised of a third material deposited over the overlay layer and the optical waveguide.

27 Claims, 6 Drawing Sheets

(56) References Cited

U.S. PATENT DOCUMENTS

| | | | | |
|---|---|---|---|---|
| 6,295,395 B1* | 9/2001 | Paek | G02B 6/29311 343/720 |
| 6,307,617 B1* | 10/2001 | Nishiki | G02B 6/02123 355/53 |
| 6,393,177 B2* | 5/2002 | Paek | G02B 6/2932 343/720 |
| 6,421,478 B1* | 7/2002 | Paiam | G02B 6/12014 385/24 |
| 6,587,615 B1* | 7/2003 | Paiam | G02B 6/12014 385/24 |
| 6,591,034 B1* | 7/2003 | Albrecht | G02B 6/12016 385/24 |
| 6,735,368 B2* | 5/2004 | Parker | B82Y 20/00 385/1 |
| 6,920,264 B2* | 7/2005 | Tabuchi | G02B 6/105 385/37 |
| 7,397,986 B2* | 7/2008 | Bulthuis | G02B 6/12014 385/37 |
| 7,689,072 B2* | 3/2010 | Bulthuis | G02B 6/12014 385/14 |
| 8,873,910 B2* | 10/2014 | Bulthuis | G02B 6/12028 385/132 |
| 9,081,252 B2* | 7/2015 | Aflatouni | G02B 6/34 |
| 9,939,577 B2* | 4/2018 | Inoue | G02B 6/021 |
| 2003/0228104 A1* | 12/2003 | Tabuchi | G02B 6/105 385/37 |
| 2006/0159395 A1* | 7/2006 | Hnatiw | G02B 6/12011 385/37 |
| 2006/0198579 A1* | 9/2006 | Bulthuis | G02B 6/12014 385/37 |
| 2008/0226232 A1* | 9/2008 | Bulthuis | G02B 6/12014 385/37 |
| 2011/0229080 A1* | 9/2011 | Bulthuis | G02B 6/12011 385/37 |
| 2014/0055832 A1* | 2/2014 | Aflatouni | G02B 6/34 359/238 |
| 2017/0168233 A1* | 6/2017 | Aflatouni | G02B 6/34 |
| 2017/0307810 A1* | 10/2017 | Inoue | G02B 6/021 |

* cited by examiner

CHIRPED GRATING SURFACE EMITTER WITH UNIFORM POWER EMISSION FOR BEAM-STEERING APPLICATIONS

CROSS-REFERENCE TO RELATED APPLICATION

This application claims priority under 35 U.S.C. § 119(e) to U.S. Provisional Application Ser. No. 62/577,981, entitled "Chirped Grating Emitter for Uniform Power Emission based on a Silicon, Silicon Nitride and Silicon Dioxide Platform," by inventors Sung-Joo Ben Yoo, Kuanping Shang and Yu Zhang, filed on 27 Oct. 2017, the contents of which are incorporated by reference herein.

U.S. GOVERNMENT LICENSE RIGHTS

This invention was made with U.S. government support under Grant No. HR0011-16-C-0106, awarded by the Defense Advanced Research Projects Administration (DARPA). The U.S. government has certain rights in this invention.

BACKGROUND

Field

The disclosed embodiments generally relate to optical phased array systems. More specifically, the disclosed embodiments relate to a design of a chirped grating surface emitter that provides a uniform power emission to facilitate beam-steering capabilities in optical phased array systems.

Related Art

Optical phased array systems are attracting considerable interest in optical beam-steering applications, such as free-space optical interconnects, sensing, data communications, and light detection and ranging lidar. For beam-steering optical phased arrays that display far-field patterns with sharp instantaneous field of view (IFOV), it is important to provide a surface emission grating with a long effective coupling length and a uniform emission angle. (See D. N. Hutchison, J. Sun, J. K. Doylend, R. Kumar, J. Heck, W. Kim, C. T. Phare, A. Feshali, and H. Rong, "High-resolution aliasing-free optical beam steering," Optica 3(8), 887-890, 2016.) It is also important to provide a uniform emission intensity to facilitate multi-tiling of such optical phased arrays.

Typical silicon-photonic gratings exhibit emission lengths shorter than a few hundred micrometers due to the relatively high refractive index contrast between the silicon core and the $SiO_2$ cladding. (See D. Kwong, A. Hosseini, J. Covey, Y. Zhang, X. Xu, H. Subbaraman, and R. T. Chen, "On-chip silicon optical phased array for two-dimensional beam steering," Opt. Lett. 39(4), 941-944, 2014.) One way to reduce the surface emission rate is to employ shallow etch depths on silicon. However, the fabrication of gratings with an ultra-shallow etching process is very difficult.

Hence, what is needed is a surface emission grating that provides a uniform emission rate, and which is practical to fabricate.

SUMMARY

The disclosed embodiments relate to the design of an optical phased array grating. This optical phased array grating includes an optical waveguide comprising a first material having a uniform lateral width, wherein the first material confines the optical waveguide as the optical waveguide core. It also includes an overlay layer comprising a sequence of overlays made of a second material spaced across a top surface of the optical waveguide, wherein successive overlays in the sequence have continuously varying longitudinal duty cycles and continuously varying lateral widths between an input end and an output end of the overlay layer, and wherein the second material has a lower optical index than the first material.

In some embodiments, the optical phased array grating also includes a cladding layer comprised of a third material deposited over the overlay layer and the optical waveguide.

In some embodiments, an emission rate increases continuously and a propagation constant remains uniform between the input end and the output end of the overlay layer.

In some embodiments, the overlay layer has a larger longitudinal duty cycle and a narrower lateral width at the input end, and a smaller longitudinal duty cycle and a wider lateral width at the output end.

In a variation on these embodiments, the longitudinal duty cycle of the overlay layer starts at a relatively high value at the input end and continuously decreases between successive overlays to approach 0.5 at the output end.

In some embodiments, the overlay layer has a smaller longitudinal duty cycle and a wider lateral width at the input end, and a larger longitudinal duty cycle and a narrower lateral width at the output end.

In a variation on these embodiments, the longitudinal duty cycle of the overlay layer starts at a relatively low value at the input end and continuously increases between successive overlays to approach 0.5 at the output end.

In some embodiments, the overlay layer has a 60 nm thickness.

In some embodiments, the overlay layer has a 500 nm lateral width at the output end.

In some embodiments, the optical waveguide has a uniform 500 nm lateral width.

In some embodiments, the first material comprises silicon, the second material comprises silicon nitride, and the third material comprises silicon dioxide.

The disclosed embodiments relate to the design of a lidar system, which includes: an optical emitter configured to direct light toward one or more target objects; and an optical receiver configured to detect reflected light from the target objects. The optical emitter includes an optical phased array grating that facilitates optical beam steering. This optical phased array grating includes an optical waveguide comprising a first material having a uniform lateral width, wherein the first material confines the optical waveguide as the optical waveguide core. It also includes an overlay layer comprising a sequence of overlays made of a second material spaced across a top surface of the optical waveguide, wherein successive overlays in the sequence have continuously varying longitudinal duty cycles and continuously varying lateral widths between an input end and an output end of the overlay layer, and wherein the second material has a lower optical index than the first material.

DETAILED DESCRIPTION

Figure 1A:
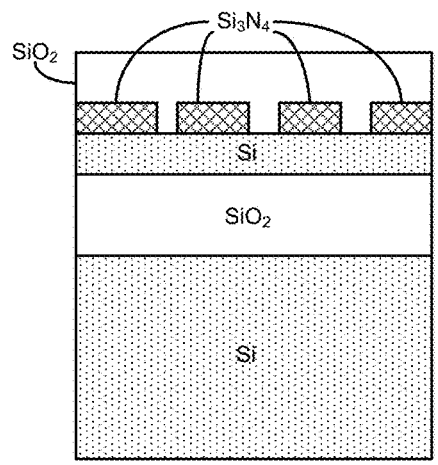
FIG. 1A presents a cross-sectional view of a customized grating with varying duty cycles and widths in accordance with disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide constant-wave-vector silicon gratings with uniform-emission-intensity profiles. These gratings operate by using silicon nitride ($Si_3N_4$) as a low index material overlay for ultra-sharp IFOV surface-emission grating applications. $Si_3N_4$-based optical devices are attractive because of their relatively low propagation loss and fabrication compatibility to silicon. Pure silicon nitride-based gratings can also achieve low emission rates with small IFOV. However, they require additional low-loss coupling solutions to integrate with silicon photonics. Therefore, we have engineered the emission rate to facilitate a longer effective coupling length, while maintaining a uniform propagation constant throughout the grating by varying both the width and the duty cycle of the $Si_3N_4$ overlay layer. As a result, the mode with uniform propagation constant forms a clear far-field pattern with narrow beam width, while the other modes scatter as background without introducing additional side lobes. This property of the custom grating also serves as a mode-selection mechanism, which is useful to filter emissions from undesired polarization rotations due to perturbations in the waveguide.

Figure 1B:
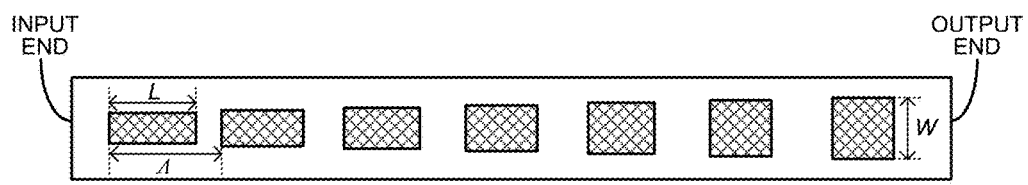
FIG. 1B presents an overhead view of the customized grating with varying duty cycles and widths in accordance with disclosed embodiments.

In one embodiment, the proposed custom grating comprises a 60 nm thick $Si_3N_4$ layer as the overlay material on a 500-nm thick silicon layer as the waveguide with a $SiO_2$ cladding. FIG. 1A provides a cross-sectional view of this custom grating structure, and FIG. 1B provides a corresponding overhead view.

Figure 1C:
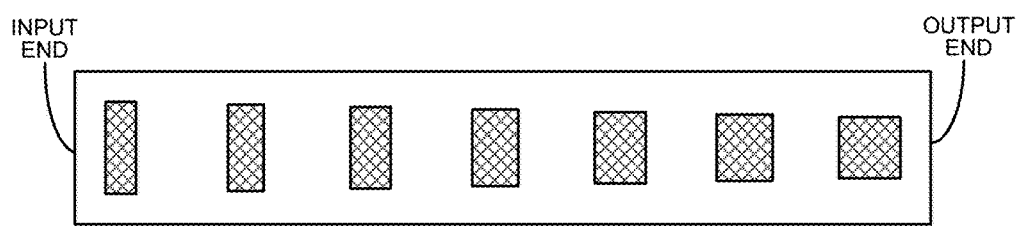
FIG. 1C presents an overhead view of an alternative embodiment of the customized grating with varying duty cycles and widths in accordance with disclosed embodiments.

An alternative custom grating structure is illustrated in FIG. 1C. The grating structures illustrated in FIGS. 1B and 1C achieve the same effect by providing a lower contrast at the input end of the grating and a higher contrast at the output end. The grating in FIG. 1B achieves this by providing a relatively larger duty cycle (much larger than 0.5) and a narrower width at the input end, and a smaller duty cycle (0.5) and a wider lateral width at the output end. In contrast, the grating illustrated in FIG. 1C achieves the same effect by providing a relatively smaller duty cycle (much smaller than 0.5) and a wider width at the input end, and a larger duty cycle (0.5) and a narrower width at the output end.

In the grating illustrated in FIG. 2A, the width of the silicon waveguide is 500 nm throughout the grating to maintain weak emission. On top of the silicon layer, the $Si_3N_4$ overlay layer employs various widths and duty cycles, to balance the power emission rate and to increase the effective coupling length. The design of the silicon guiding core is compatible with future integration with a hybrid InP/Si phase tuner. It also provides sufficient room for index-variations of the $Si_3N_4$ overlays, and prevents potential cross-coupling between the adjacent grating-waveguides for future grating-waveguide-array lidar applications, which can involve ultra-long (>2 mm) and ultra-dense (2 μm spacing) grating array waveguides. The period A of the grating is 574 nm. The incident angle $\theta_i$ is 90°. The output medium is air, whose refractive index value no equals 1.0. According to Eq. (1) below, the corresponding center output angle is 13° at a 1550 nm wavelength (2) when m=1, where $n_i$ is the effective refractive index of the grating. (Note that Eq. (1) is taken from K. Okamoto, Fundamentals of Optical Waveguides, Academic, 2010.)

$$n_o \sin\theta_o = n_i \sin\theta_i - m\frac{\lambda}{\Lambda} \quad (1)$$

Figure 2:
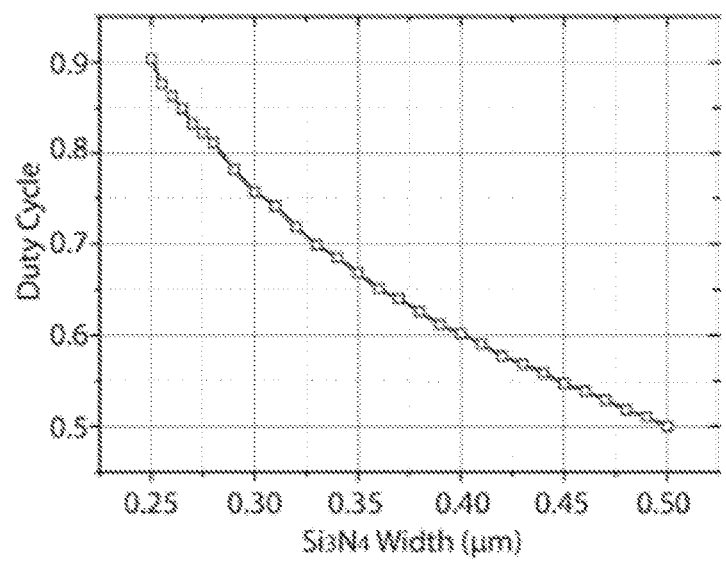
FIG. 2 presents a graph illustrating simulated combinations of duty cycle and $Si_3N_4$ width in accordance with disclosed embodiments.

The propagation constant of the grating structure depends on the width of the $Si_3N_4$ overlay and the duty cycle. To maintain a uniform propagation constant, the $Si_3N_4$ layer employs a larger duty cycle with narrower $Si_3N_4$ at the input end and 0.5 duty cycle with 500 nm width at the output end with continuous transition between the two ends. When the duty cycle or δ value equals 0, the propagation constant in the grating equals that in the silicon waveguide. FIG. 2 shows the designed duty cycles and width values for the custom grating, which maintains a uniform propagation constant. (The graph in FIG. 2 was generated using the Lumerical MODE Solution™ simulation tool.)

We introduce the coupling constant, κ, in Eq. (2) below, to discuss the effective refractive index contrast of the grating, where $n_{eff1}$, $n_{eff2}$, and $n_{eff}$ are the effective refractive index of the high index sections, the low index sections, and their weighted average values of the grating, respectively.

$$\kappa = \frac{n_{eff2} - n_{eff1}}{n_{eff} \Lambda} \quad (2)$$

Figure 3A:
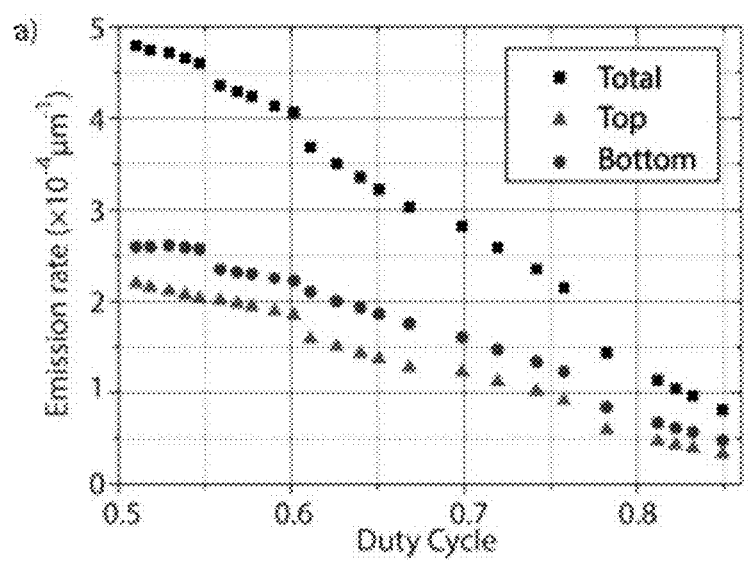
FIG. 3A presents a graph illustrating a simulated emission rate for the customized grating in accordance with disclosed embodiments.
Figure 3B:
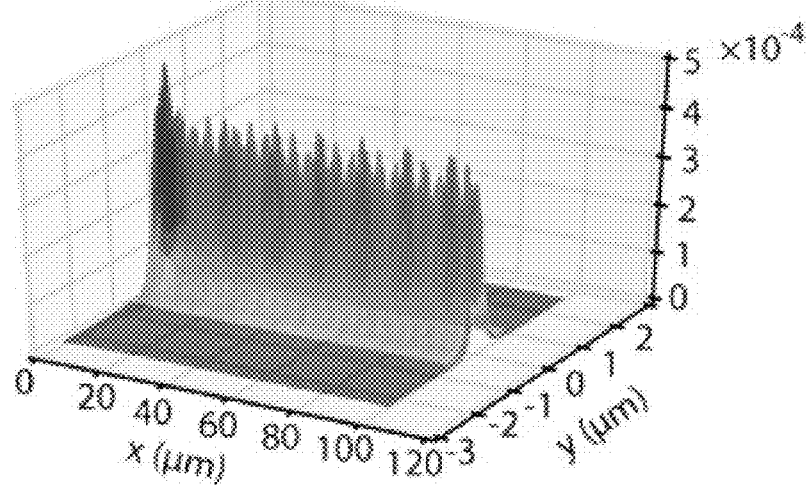
FIG. 3B presents a graph illustrating a simulation of intensity distribution launching from x=0 μm for top emission in accordance with disclosed embodiments.

Typically, a wider $Si_3N_4$ overlay layer achieves a greater κ value as well as a higher emission rate. In addition, $Si_3N_4$ overlay duty cycles closer to 0.5 result in stronger emissions. As a result, the proposed custom grating illustrated in FIG. 2B demonstrates its emission rate increasing with the duty cycle approaching 0.5 and the $Si_3N_4$ width gradually increasing. The corresponding κ values vary from 17.0 $cm^{-1}$ to 28.9 $cm^{-1}$. FIG. 3A illustrates the simulated emission rate of the custom grating with varying duty cycles (or $Si_3N_4$ width values), where the triangles, circles, and boxes indicate top, bottom, and total emissions, respectively. Note that the emission to the top is slightly smaller than that to the bottom, which limits the emission efficiency to less than 0.5. One way to collect the bottom emission light is to integrate a reflective mirror underneath the grating, such as metal layers or distributed Bragg reflectors. FIG. 3B shows the simulation of the top emission intensity distribution assuming the input power is 1 mW. (The graphs in FIGS. 3A-3B were generated using the Lumerical FDTD Solution™ simulation tool.) In the custom grating design, the duty cycles and $Si_3N_4$ width values were 0.85 and 265 nm at the input end, and 0.5 and 500 nm at the output end. The corresponding emission rate values were $0.33 \times 10^{-4}$ $\mu m^{-1}$ and $2.2 \times 10^{-4}$ $\mu m^{-1}$, respectively. Between the two ends, the emission rate increases continuously, while the uniform propagation remains constant.

Figure 4A:
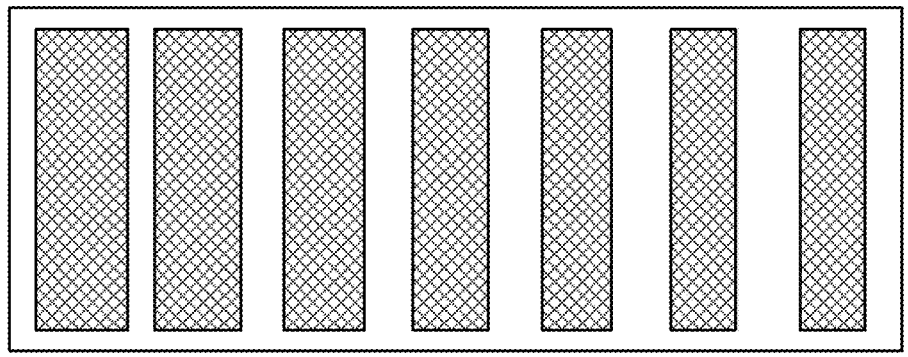
FIG. 4A illustrates the process of defining the duty cycle of the $Si_3N_4$ overlay in accordance with disclosed embodiments.
Figure 4B:
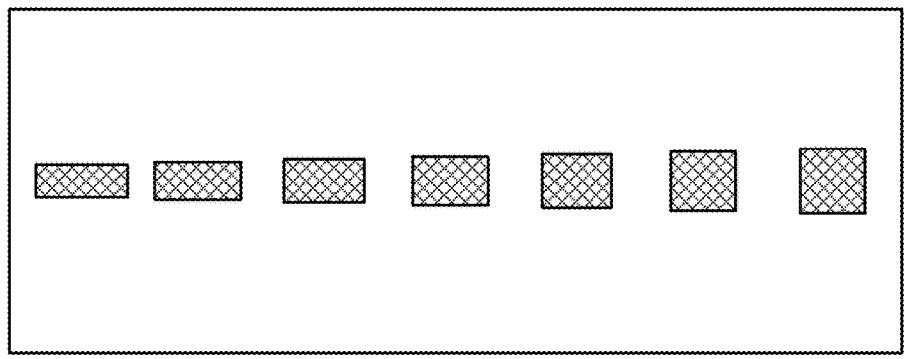
FIG. 4B illustrates the process of defining the width of the $Si_3N_4$ overlay in accordance with disclosed embodiments.
Figure 4C:
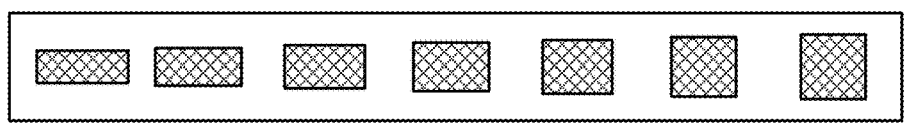
FIG. 4C illustrates the process of defining a width of the silicon guiding core in accordance with disclosed embodiments.

FIGS. 4A-4C illustrate fabrication steps for the custom grating. Note that the fabrication process can involve projection lithography using an ASML™ PAS 5500 300 deep-UV stepper on 6-inch silicon-on-insulator (SOI) wafers, each with a 500-nm thick silicon layer and a 3-μm thick buried oxide (BOX) cladding layer. The first fabrication step starts with the growth of a 60-nm thick $Si_3N_4$ layer on the SOI by low-pressure chemical vapor deposition (LPCVD) at 800° C. We define the duty cycle of the $Si_3N_4$ layer through dry etching on a 10-μm wide area using inductively coupled plasma (ICP) dry etching, as is illustrated in FIG. 4A. Over the dry etched area, we subsequently pattern photoresist to define the width of $Si_3N_4$ and proceed with dry etching, as is illustrated in FIG. 4B. Afterwards, over the custom $Si_3N_4$ grating with varying widths and duty cycles, we fully etch the silicon guiding layer with a constant width of 500 nm, as is illustrated in FIG. 4C. Finally, we deposit a 2-jam thick low-temperature oxide (LTO) layer by LPCVD as the over-cladding, deep-etch the facet edge coupler of 100 jam depth for fiber coupling, and dice the wafers.

Figure 5:
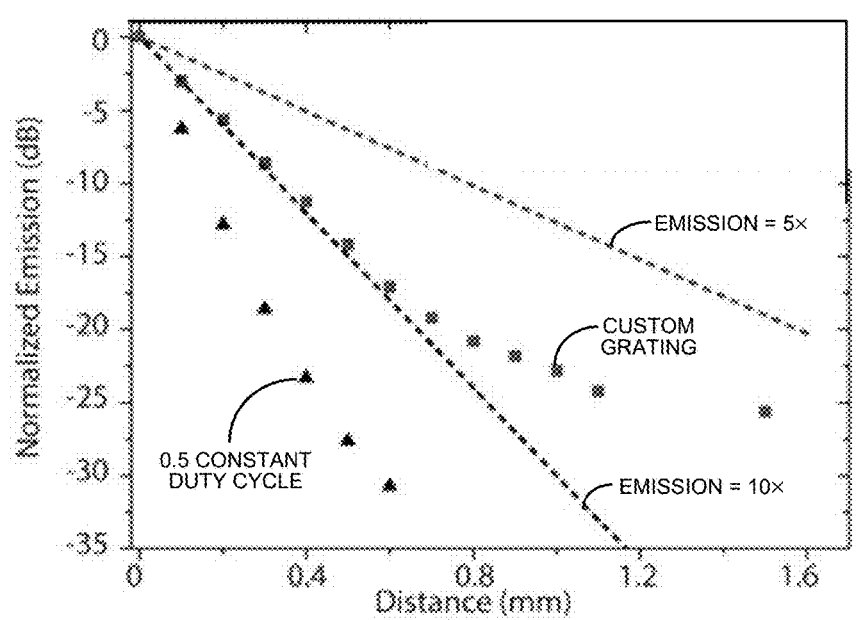
FIG. 5 presents a graph comparing emissions between a 0.5 constant duty cycle grating and a customized grating in accordance with disclosed embodiments.

The simulated grating designs include two types of gratings, which are: (1) the variable duty cycle grating (custom grating); and (2) the constant duty cycle 0.5 grating. The measurement setup uses a cleaved multi-mode fiber to collect light from the top and a lensed single-mode fiber launching light from the input facet. The length of the grating under test was 2 mm. The graph that appears in FIG. 5 indicates the normalized surface emission of the custom grating and the 0.5 constant duty cycle grating. Overall, the custom grating shows a longer coupling length than the 0.5 constant duty cycle grating. However, the measured emission rate is stronger than the simulated values, which is possibly due to the over-etch into the silicon top surface during the $Si_3N_4$ dry etching process, where the large κ value between the silicon core and the $SiO_2$ cladding enhances the emission rate. To solve the over-etching issue, one solution is to incorporate the design of partially etched $Si_3N_4$ grating instead of fully etched grating.

Process for Operating a Lidar System

Figure 6:
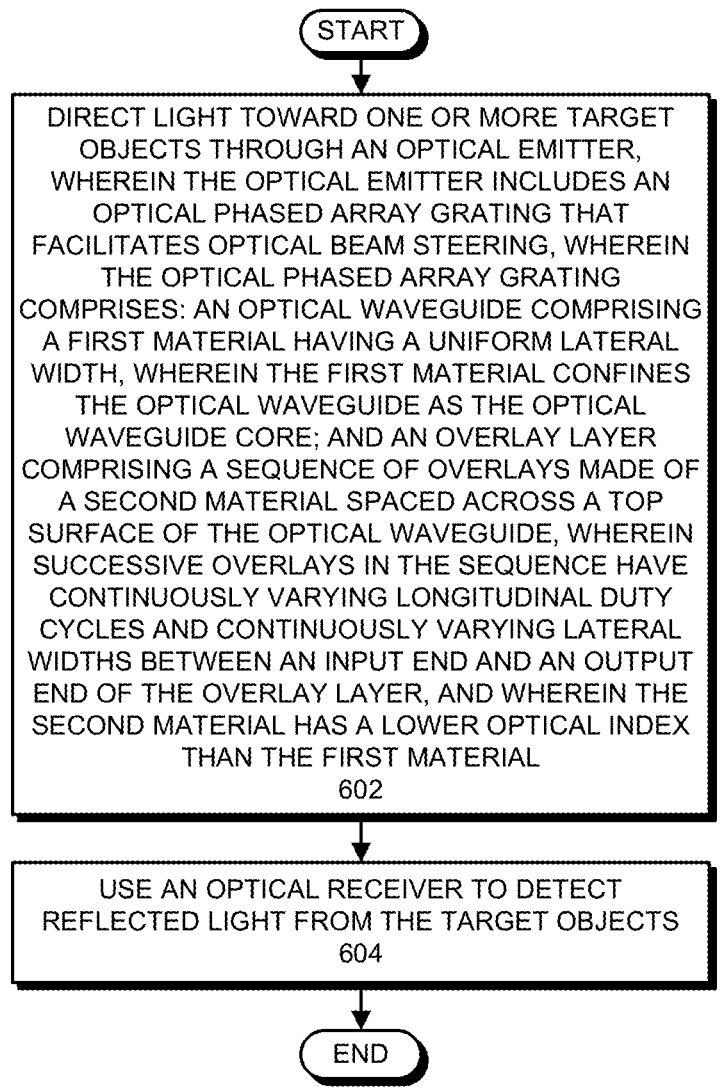
FIG. 6 presents a flowchart illustrating a process for operating a lidar system in accordance with disclosed embodiments.

FIG. 6 presents a flowchart illustrating a process for operating a lidar system in accordance with disclosed embodiments. During operation, the lidar system directs light toward one or more target objects through the optical emitter, wherein the optical emitter includes an optical phased array grating that facilitates optical beam steering, and wherein the optical phased array grating comprises: an optical waveguide comprising a first material having a uniform lateral width, wherein the first material confines the optical waveguide as the optical waveguide core; and an overlay layer comprising a sequence of overlays made of a second material spaced across a top surface of the optical waveguide, wherein successive overlays in the sequence have continuously varying longitudinal duty cycles and continuously varying lateral widths between an input end and an output end of the overlay layer, and wherein the second material has a lower optical index than the first material (step 602). Next, the lidar system uses an optical receiver to detect reflected light from the target objects (step 604).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An optical phased array grating, comprising:
   an optical waveguide comprising a first material having a uniform lateral width, wherein the first material confines the optical waveguide as the optical waveguide core; and an overlay layer comprising a sequence of overlays made of a second material spaced across a top surface of the optical waveguide, wherein successive overlays in the sequence have continuously varying longitudinal duty cycles and continuously varying lateral widths between an input end and an output end of the overlay layer, and wherein the second material has a lower optical index than the first material.

2. The optical phased array grating of claim 1, further comprising a cladding layer comprised of a third material deposited over the overlay layer and the optical waveguide.

3. The optical phased array grating of claim 1, wherein an emission rate increases continuously and a propagation constant remains uniform between the input end and the output end of the overlay layer.

4. The optical phased array grating of claim 1, wherein the overlay layer has a larger longitudinal duty cycle and a narrower lateral width at the input end, and a smaller longitudinal duty cycle and a wider lateral width at the output end.

5. The optical phased array grating of claim 4, wherein the longitudinal duty cycle of the overlay layer starts at a relatively high value at the input end and continuously decreases between successive overlays to approach 0.5 at the output end.

6. The optical phased array grating of claim 1, wherein the overlay layer has a smaller longitudinal duty cycle and a wider lateral width at the input end, and a larger longitudinal duty cycle and a narrower lateral width at the output end.

7. The optical phased array grating of claim 6, wherein the longitudinal duty cycle of the overlay layer starts at a relatively low value at the input end and continuously increases between successive overlays to approach 0.5 at the output end.

8. The optical phased array grating of claim 1, wherein the overlay layer has a 60 nm thickness.

9. The optical phased array grating of claim 1, wherein the overlay layer has a 500 nm lateral width at the output end.

10. The optical phased array grating of claim 1, wherein the optical waveguide has a uniform 500 nm lateral width.

11. The optical phased array grating of claim 1,
wherein the first material comprises silicon;
wherein the second material comprises silicon nitride; and
wherein the third material comprises silicon dioxide.

12. A lidar system, comprising:
an optical emitter configured to direct light toward one or more target objects; and
an optical receiver configured to detect reflected light from the target objects;
wherein the optical emitter includes an optical phased array grating that facilitates optical beam steering, wherein the optical phased array grating comprises,
an optical waveguide comprising a first material having a uniform lateral width, wherein the first material confines the optical waveguide as the optical waveguide core; and
an overlay layer comprising a sequence of overlays made of a second material spaced across a top surface of the optical waveguide, wherein successive overlays in the sequence have continuously varying longitudinal duty cycles and continuously varying lateral widths between an input end and an output end of the overlay layer, and wherein the second material has a lower optical index than the first material.

13. The lidar system of claim 12, wherein the optical phased array grating further comprises a cladding layer comprised of a third material deposited over the overlay layer and the optical waveguide.

14. The lidar system of claim 12, wherein an emission rate increases continuously and a propagation constant remains uniform between the input end and the output end of the overlay layer.

15. The lidar system of claim 12, wherein the overlay layer has a larger longitudinal duty cycle and a narrower lateral width at the input end, and a smaller longitudinal duty cycle and a wider lateral width at the output end.

16. The lidar system of claim 15, wherein the longitudinal duty cycle of the overlay layer starts at a relatively high value at the input end and continuously decreases between successive overlays to approach 0.5 at the output end.

17. The lidar system of claim 12, wherein the overlay layer has a smaller longitudinal duty cycle and a wider lateral width at the input end, and a larger longitudinal duty cycle and a narrower lateral width at the output end.

18. The lidar system of claim 17, wherein the longitudinal duty cycle of the overlay layer starts at a relatively low value at the input end and continuously increases between successive overlays to approach 0.5 at the output end.

19. The lidar system of claim 12,
wherein the first material comprises silicon;
wherein the second material comprises silicon nitride; and
wherein the third material comprises silicon dioxide.

20. A method for operating a lidar system comprising an optical emitter and an optical receiver, comprising:
directing light toward one or more target objects through the optical emitter, wherein the optical emitter includes an optical phased array grating that facilitates optical beam steering, wherein the optical phased array grating comprises,
an optical waveguide comprising a first material having a uniform lateral width, wherein the first material confines the optical waveguide as the optical waveguide core; and
an overlay layer comprising a sequence of overlays made of a second material spaced across a top surface of the optical waveguide, wherein successive overlays in the sequence have continuously varying longitudinal duty cycles and continuously varying lateral widths between an input end and an output end of the overlay layer, and wherein the second material has a lower optical index than the first material; and
using the optical receiver to detect reflected light from the target objects.

21. The method of claim 20, wherein the optical phased array grating further comprises a cladding layer comprised of a third material deposited over the overlay layer and the optical waveguide.

22. The method of claim 20, wherein an emission rate increases continuously and a propagation constant remains uniform between the input end and the output end of the overlay layer.

23. The method of claim 20, wherein the overlay layer has a larger longitudinal duty cycle and a narrower lateral width at the input end, and a smaller longitudinal duty cycle and a wider lateral width at the output end.

24. The method of claim 23, wherein the longitudinal duty cycle of the overlay layer starts at a relatively high value at the input end and continuously decreases between successive overlays to approach 0.5 at the output end.

25. The method of claim 20, wherein the overlay layer has a smaller longitudinal duty cycle and a wider lateral width at the input end, and a larger longitudinal duty cycle and a narrower lateral width at the output end.

26. The method of claim 25, wherein the longitudinal duty cycle of the overlay layer starts at a relatively low value at the input end and continuously increases between successive overlays to approach 0.5 at the output end.

27. The method of claim 20,
wherein the first material comprises silicon;
wherein the second material comprises silicon nitride; and
wherein the third material comprises silicon dioxide.

* * * * *